Aug. 29, 1950 W. W. KEMP 2,520,213
GAS PROPORTIONING APPARATUS
Filed April 4, 1944 4 Sheets-Sheet 1

Inventor
W. W. KEMP
Thomas W. Clark
Attorney

Inventor
W. W. KEMP.

Patented Aug. 29, 1950

2,520,213

UNITED STATES PATENT OFFICE 2,520,213

GAS PROPORTIONING APPARATUS

William Wallace Kemp, Baltimore, Md., assignor to The C. M. Kemp Manufacturing Company, Baltimore, Md., a corporation of Maryland Application April 4, 1944, Serial No. 529,541

7 Claims. (Cl. 137—164)

This invention relates to apparatus for burning together two gases fed in proportions to chemically combine both in the burning.

In the past two gases have been burned together after being properly proportioned and intimately mixed prior to burning.

The object of the present invention is to accurately proportion two gases in preparation for combustion of both without mixing, examples are the burning of air and hydrogen for certain processes and likewise the burning of chlorine and hydrogen for other processes. Both hydrogen and chlorine and hydrogen and air when mixed in proper ratio, explode readily when passed through a piping system. They even explode when introduced into a burner together and before their passing through that burner.

By the proportioning mechanism of the instant invention any two gases may be accurately proportioned by common operating mechanisms and fed on through separate conduits to a burner head which maintains them separate until they actually reach the face of the burner for combustion. Although various intercommunicating mechanisms are provided for the conduits carrying the two gases, yet means are provided to keep the two gases from contact prior to their actual exit from the burner face.

Figure 1:
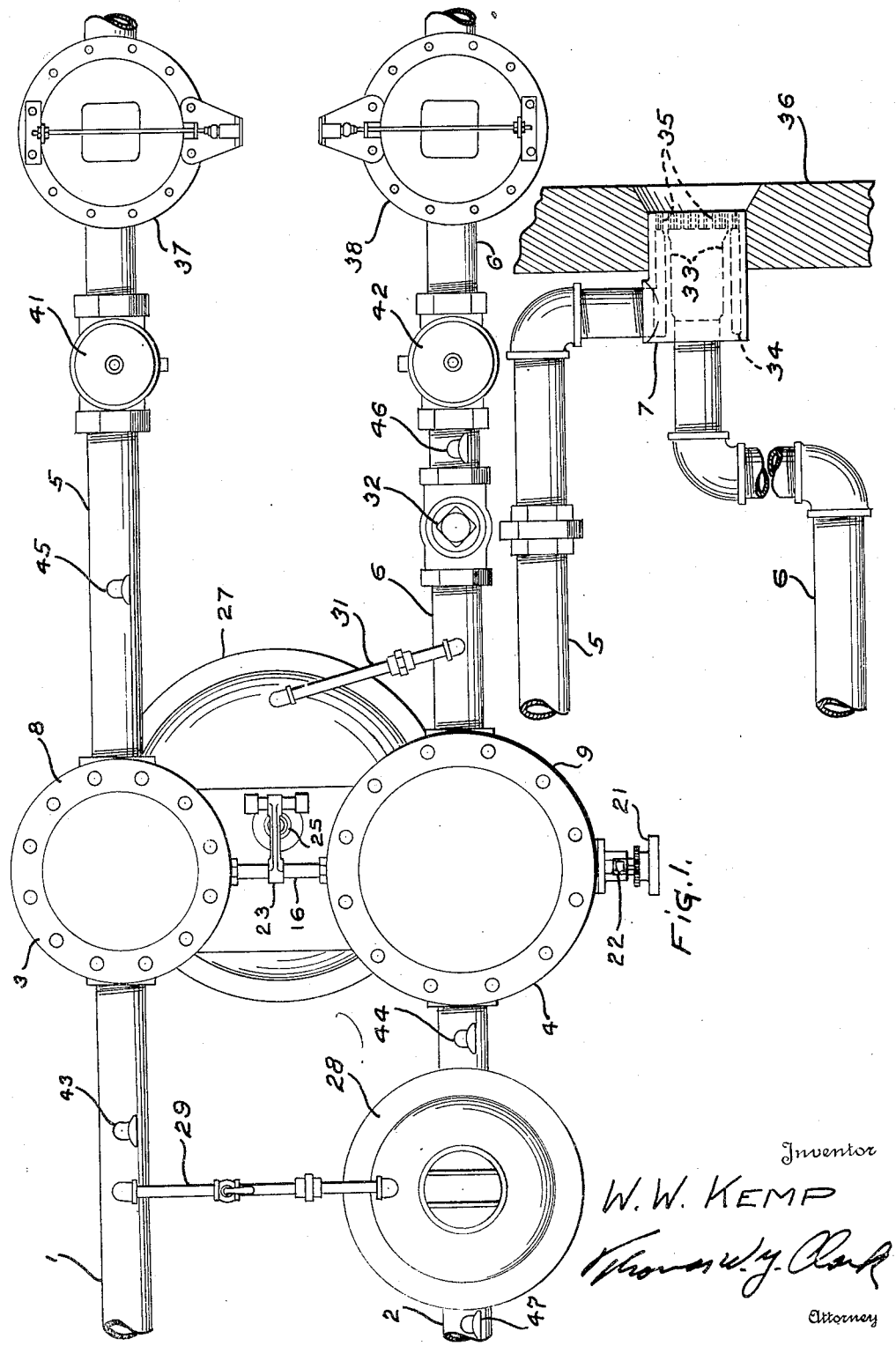
Figure 2:
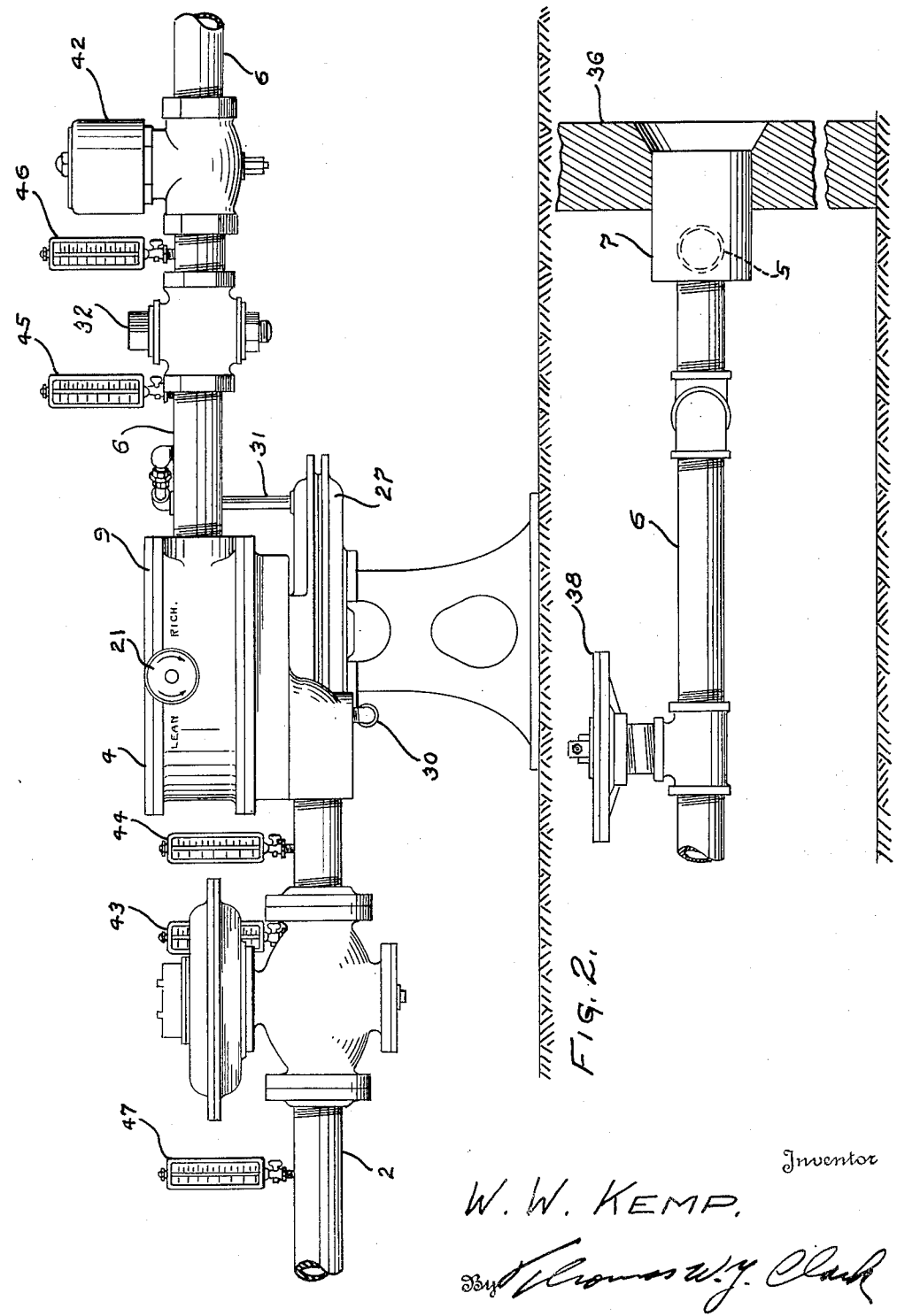
Figure 3:
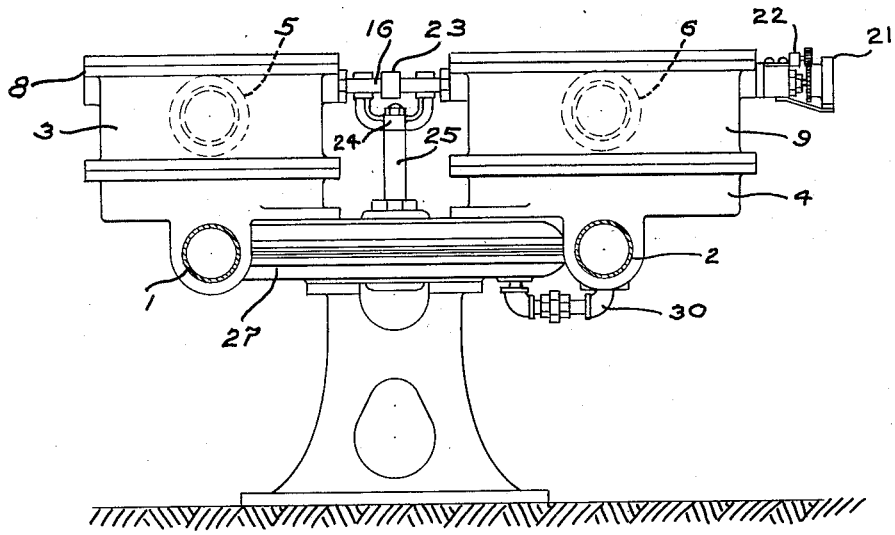
Figure 4:
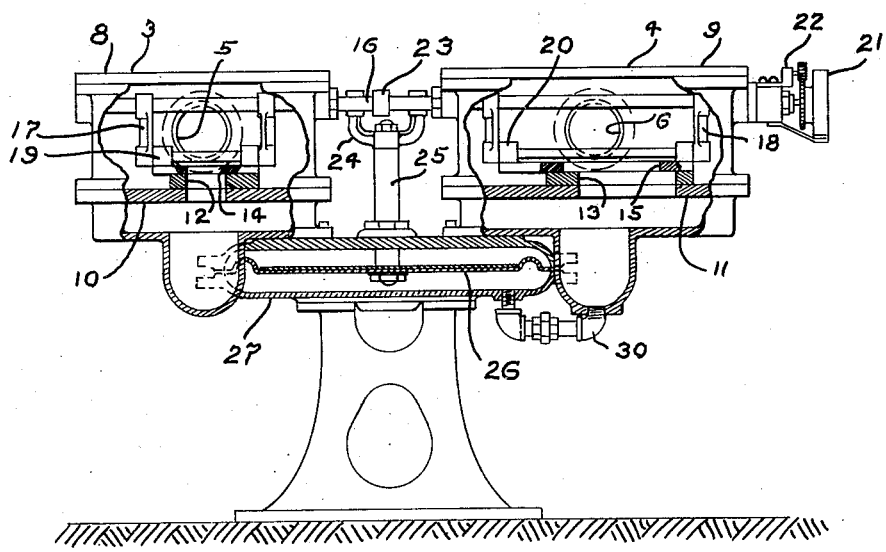
Figure 5:
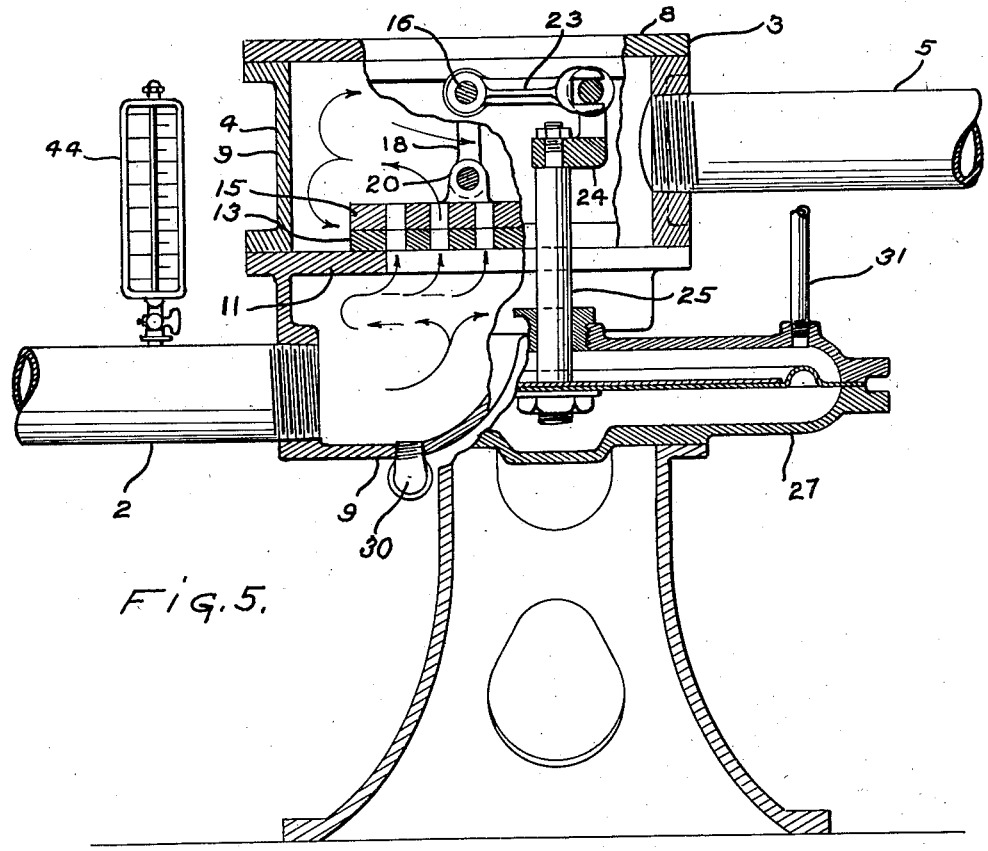
Figure 6:
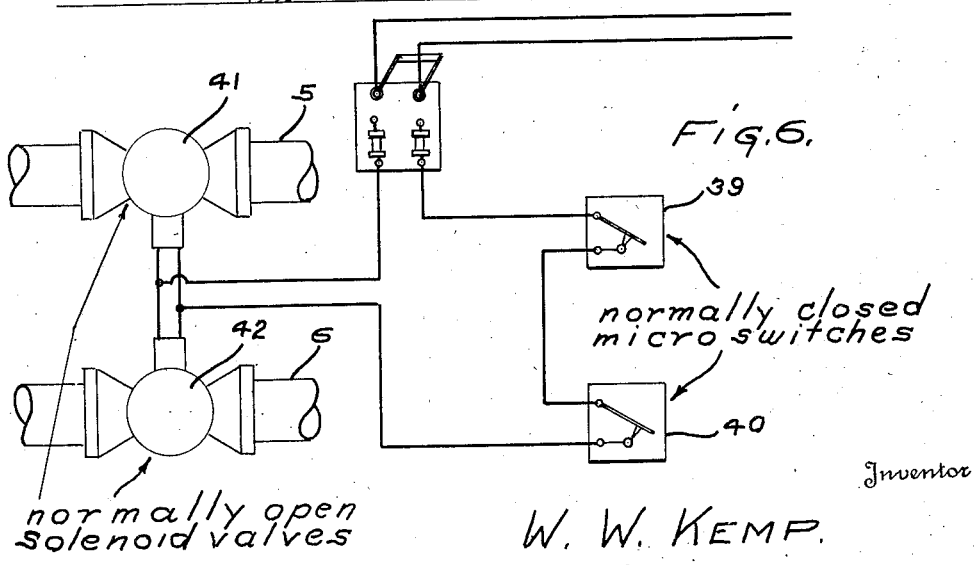

Other objects of the invention are to provide means for maintaining relative pressures or a constant pressure differential in one conduit in relation to that in the other and means for varying the relative proportions of the gases fed and providing apparatus for either increasing or decreasing the proportioned feeding of the two gases in accordance with the demand at the burner face or faces. Other objects are to so maintain the separateness of the gases as to prevent any backfiring in any of the conduits and consequent injury to the apparatus. Other objects and advantages will be apparent from the following description and accompanying drawings forming a part hereof and in which:

Figure 1 is a plan view of the invention. Figure 2 is a side elevational view thereof. Figure 3 is an end elevational view of the proportioning valves and their operating mechanism. Figure 4 is an irregular cross-sectional view of the same. Figure 5 is an irregular cross-sectional view at right angles to Figure 4 and Figure 6 is a diagrammatic view of the wiring diagram.

In the drawings similar numerals refer to similar parts throughout the several views.

Hydrogen or chlorine or another gas enters the apparatus through conduit 1 and air or yet another gas, through conduit 2. These conduits enter respectively valves 3 and 4 and the gases then pass from these valves through conduits 5 and 6 to burner 7.

Valves 3 and 4 are composed of housings or casings 8 and 9 into the bottom of which the conduits 1 and 2 fit as particularly shown in Figures 3 and 5. The casings have horizontal partitions 10 and 11 on which are placed slotted valve seats 12 and 13. These seats have sliding thereon slotted valve gates 14 and 15 through which the gases pass in their respective valves when the gate slots are aligned with those of the seats.

The valve gates are moved horizontally by means of rockshaft 16 passing through packings in the walls of both casings 8 and 9 extending between the two valves. This rockshaft has fixedly thereon yokes 17 and 18 pivoting in trunnions 19 and 20 on the valve gates. The rockshaft 16 may be moved bodily longitudinally transversely of the two valves, in which movement it carries the valve gates. These gates are so positioned, as shown in Figure 4, that movement of the two in either direction increases the size of the openings for the passage of gas therethrough in one valve while decreasing the size of those openings in the other.

This longitudinal movement is imparted to the rockshaft through threads thereon by handwheel 21 having a gear thereon meshing with another gear driving the indicator or counter 22, so that the exact amount of movement and consequently the exact setting of the two valves relatively one to the other may be observed from the figures on the counter. The rockshaft has fixed thereto projecting arm 23 to which vertical motion is imparted by yoke 24 on stem 25 attached to diaphragm 26, stem 25 passing through a packing in the top of diaphragm chamber 27.

Movement of the rockshaft longitudinally varies the relative openings in the valves. Rocking of this rockshaft moves the valves in unison to vary the amount of proportioned gases passed through the valves.

Before the gases reach the apparatus of the invention they have approximately one pound pressure although this can be varied as desired. The air-pipe 2 passes through regulator valve 28 of conventional design, and having therein a diaphragm actuated from pressure through pipe 29 connected to the hydrogen-chlorine conduit 1. Pressure on the diaphragm opens the valve through conduit 2, releasing the pressure allows the valve to close. The regulator through this connection with the hydrogen-chlorine conduit maintains a constant pressure differential between the gases in the two conduits of approximately one ounce per square inch.

A pipe 30 leads from the air conduit before the air passes through its valve to the underside of the diaphragm chamber 27 and pipe 31 passes from the top of that chamber to the air conduit 6 after the passage of the air through its valve. The air conduit 6 has a manually controlled valve 32, which may be provided with an index, to regulate the flow of air therethrough in accordance with the demand at the burner or burners.

Although the valves are shown as feeding gases to one burner 7, it is apparent that several burners could be fed from the same conduits by placing manifolds on each conduit 5 and 6 and from these manifolds the gases could be passed to several burners similar to burner 7.

Burner 7 has a large center chamber 33 and a circular chamber 34 therearound. Both chambers have openings 35 extending therefrom to the face of the burner. The burner is shown as extending substantially through the furnace wall 36, in which construction the gases will co-mingle and burn immediately at the face of the burner.

Were it desired to protect the burner from the reflected heat of the furnace, the burners can be withdrawn back somewhat from the furnace wall about one-half inch and an opening in the wall about the size of the burner would allow the gases to be blasted into the furnace. In this construction it would be necessary to maintain a pressure in the furnace such that a slight flame would burn outwardly around the burner head into the atmosphere in order to maintain a seal at the gas inlet for the furnace against the admission of air thereto.

No valve such as that at 32 on the air conduit is required in the hydrogen-chlorine conduit. When the valve 32 is adjusted at less than the full flow of the gases through the valve 4, a small pressure will be built up in the air conduit and valve 4, which will be transmitted to the top of diaphragm 26 to move the same downwardly which will cut off the flow proportionately through both valves 3 and 4 so that valve 32 serves to keep in proper balance the proportion of gases through both conduits 5 and 6.

Although the gases do not come into contact one with the other until their exit from the burner face and consequently there is no danger of backfiring, additional safety devices of conventional design may be placed in the system in the form of soft heads 37 and 38 provided respectively with microswitches 39 and 40 which are normally closed and the opening of either of which releases normally open solenoid valves 41 and 42 in the conduits 5 and 6, the electrical diagram being shown in Figure 6. Pressure indicators are also provided before and after the valves in each conduit, at 43, 44, 45 and 46. An indicator is also provided in the air conduit ahead of regulator 28 at 47.

The proportioning valve structure and other parts of the apparatus, as shown, are intended to be illustrative rather than restrictive of the invention and some parts are shown more or less conventionally. It is intended that modifications may be made in the apparatus within the scope of the appended claims.

What is claimed as my invention and is intended to be secured by Letters Patent is:

1. In proportioning mechanism for two gases for combustion, separately housed valves for each gas, conduits maintaining said gases separate leading into and from said valves, unitary means, including said valves, to vary the relative proportion of the gases passing through the valves, means in the conduit from one of said valves to vary the volume of flow of gas through said last named conduit in accordance with the demand, and means connected to said conduit to regulate the flow of gas in both conduits in proportion to said demand, said last named means including a diaphragm chamber having therein a diaphragm operatively connected to said separate valves to operate the same in unison and to effect said last named regulation.

2. In proportioning mechanism for two gases for combustion, separately housed valves for each gas, conduits maintaining said gases separate leading into and from said valves, unitary means, including said valves, to vary the relative proportion of the gases passing through the valves, manual means in the conduit from one of said valves to vary the volume of flow of gas from said last named valve and automatically operating means to vary the volume of flow of gas from both of said valves in proportion to the flow through the manual means, said automatically operating means including a diaphragm chamber having therein a diaphragm operatively connected to said separate valves to operate the same in unison and to effect said last named regulation.

3. In proportioning mechanism for two gases for combustion, separately housed valves for each gas, conduits maintaining said gases separate leading into and from said valves, unitary means, including said valves, to vary the relative proportion of the gases passing through the valves, manual means in the delivery conduit from one valve to vary the volume of flow of gas therethrough, and means operable by the variation of gas flow in said last named conduit to proportionately vary the flow of gas from both said delivery conduits, said last named means including a diaphragm chamber having therein a diaphragm operatively connected to said separate valves to operate the same in unison and to effect said last named regulation.

4. Proportioning mechanism for two gases for combustion comprising separately housed valves for each gas, conduits maintaining said gases separate leading into and from said valves, each of said valves comprising a valve seat and a movable gate cooperating with said seat to open and close the valve, said movable gates being connected together and means to move said gates in unison to vary the relative proportion of gases passing through the valves, means in one delivery conduit to vary the volume of flow of gas therethrough and means operable by the variation of gas flow in said last named conduit to move both said gates to vary the proportioned passing of gases therethrough and through the other delivery conduit.

5. Proportioning mechanism for two gases for combustion comprising separately housed valves for each gas, conduits maintaining said gases separate leading into and from said valves, each of said valves comprising a valve seat and a movable gate cooperating with said seat to open and close the valve, said movable gates being connected together and means to move said gates in unison to vary the relative proportion of gases passing through the valves and means to move both said gates to vary the proportioned passing of gases therethrough, said last named means being operable by variations in pressure in one of said delivery conduits and said pressure variations thereby varying the flow through the other of said delivery conduits.

6. Proportioning mechanism for two gases for combustion comprising separately housed valves for each gas, conduits maintaining said gases separate leading into and from said valves, each of said valves comprising a valve seat and a movable gate cooperating with said seat to open and close the valve, said movable gates being connected together and means to move said gates in unison to vary the relative proportion of gases passing through the valves and means to move said gates to vary the proportioned passing of gases therethrough, said last named means including a diaphragm chamber having a diaphragm therein operably connected to said movable gates, and connections between said chamber leading to the inlet and outlet conduits of one of said valves, means to vary the volume of flow in said last named outlet conduit, and said diaphragm and gates thereby proportionately varying the flow in the other outlet conduit.

7. Proportioning mechanism for two gases for combustion comprising separately housed valves for each gas, conduits maintaining siad gases separate leading into and from said valves, each valve having a seat and movable gate, said gates being connected and movable together to vary the relative proportion of gases passing through the valves, a diaphragm chamber, a diaphragm therein connected to said gates to operate them in unison to vary the flow of proportioned gases therethrough, said chamber at one side of said diaphragm being connected to the one conduit before its entrance to its valve and at the other side of said diaphragm to the same conduit after its passage of said valve, whereby variations of pressure in said conduit, after passing the valve, will vary the valve gate positions and the volume of flow of gases through both delivery conduits.

WILLIAM WALLACE KEMP.

REFERENCES CITED

The following references are of record in the file of this patent:

UNITED STATES PATENTS

| Number | Name | Date |
| --- | --- | --- |
| 264,453 | Gordon | Sept. 19, 1882 |
| 990,744 | Jones | Apr. 25, 1911 |
| 1,078,790 | Machlet | Nov. 18, 1913 |
| 1,347,955 | Ionides | July 27, 1920 |
| 1,363,413 | Keith | Dec. 28, 1920 |
| 1,537,079 | McKee | Feb. 16, 1926 |
| 1,673,872 | Huessener | June 19, 1928 |
| 1,771,223 | Kemp | July 22, 1930 |
| 1,880,141 | Kemp | Sept. 27, 1932 |
| 1,967,164 | Thomas | July 17, 1934 |
| 2,003,226 | Weller | May 28, 1935 |
| 2,134,745 | Ziebolz et al. | Nov. 1, 1938 |
| 2,150,533 | Wiegand et al. | Mar. 14, 1939 |
| 2,341,177 | Cope | Feb. 8, 1944 |

FOREIGN PATENTS

| Number | Country | Date |
| --- | --- | --- |
| 552,778 | Germany | of 1932 |